United States Patent
Jungert et al.

(12)

(10) Patent No.: US 8,251,425 B2
(45) Date of Patent: Aug. 28, 2012

(54) SEAT FRAME FOR A VEHICLE SEAT

(75) Inventors: Dieter Jungert, Weissach (DE); Tassilo Gilbert, Pforzheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 260 days.

(21) Appl. No.: 12/767,864

(22) Filed: Apr. 27, 2010

(65) Prior Publication Data

US 2010/0283282 A1  Nov. 11, 2010

(30) Foreign Application Priority Data

May 9, 2009  (DE) .................. 10 2009 020 586

(51) Int. Cl.
*B60N 2/00* (2006.01)
(52) U.S. Cl. .................. 296/64; 296/63; 297/452.18
(58) Field of Classification Search .............. 296/63, 296/64; 297/452.18
See application file for complete search history.

(56) References Cited

U.S. PATENT DOCUMENTS

| | | | | |
|---|---|---|---|---|
| 3,632,159 A * | 1/1972 | Barecki | ........................... | 296/63 |
| 3,737,198 A * | 6/1973 | Barecki et al. | .............. | 297/450.1 |
| 3,747,979 A * | 7/1973 | Barecki | ...................... | 297/451.1 |
| 3,841,703 A * | 10/1974 | Lowe | ......................... | 297/440.2 |
| 4,077,664 A * | 3/1978 | Harder, Jr. | ................. | 297/183.8 |
| 4,186,966 A * | 2/1980 | Harder, Jr. | ................. | 297/452.2 |
| 4,236,750 A * | 12/1980 | Moritz | ....................... | 297/216.1 |
| D318,578 S * | 7/1991 | Leib | .............................. | D6/381 |
| 5,375,914 A * | 12/1994 | Donnelly | ..................... | 297/335 |
| 5,876,085 A * | 3/1999 | Hill | ........................... | 296/65.02 |
| 5,918,943 A | 7/1999 | Mitschelen et al. | | |
| 6,629,729 B2 * | 10/2003 | Wiedeman et al. | ........... | 297/232 |
| 6,761,400 B2 * | 7/2004 | Hobson | ........................ | 297/201 |
| 7,140,682 B2 * | 11/2006 | Jaeger et al. | .................. | 297/330 |
| D638,634 S * | 5/2011 | Figueras Mitjans | ........... | D6/364 |
| 2001/0003962 A1 * | 6/2001 | Park et al. | ..................... | 108/140 |
| 2003/0127891 A1 * | 7/2003 | Wiedeman et al. | ........... | 297/232 |
| 2004/0075322 A1 * | 4/2004 | Jaeger et al. | ................... | 297/325 |
| 2004/0160113 A1 * | 8/2004 | Rehfuss et al. | .......... | 297/452.52 |
| 2005/0206211 A1 | 9/2005 | Kim | | |
| 2007/0216203 A1 * | 9/2007 | Rajasingham | ........... | 297/216.11 |
| 2007/0252423 A1 * | 11/2007 | Schulz et al. | ............ | 297/452.38 |
| 2008/0007102 A1 * | 1/2008 | Dahlbacka et al. | ......... | 297/284.4 |
| 2008/0012403 A1 * | 1/2008 | Foelster et al. | ............ | 297/217.1 |
| 2008/0023995 A1 * | 1/2008 | Ott et al. | .................... | 297/284.1 |
| 2008/0030060 A1 * | 2/2008 | Schwingenschlogel et al. | ........................ | 297/354.12 |
| 2009/0039690 A1 * | 2/2009 | Simon et al. | ............... | 297/344.1 |
| 2009/0315383 A1 * | 12/2009 | Braun | ....................... | 297/452.11 |
| 2010/0171346 A1 * | 7/2010 | Laframboise et al. | ..... | 297/183.1 |

FOREIGN PATENT DOCUMENTS

DE  27 51 110  5/1979

(Continued)

*Primary Examiner* — Lori Lyjak
(74) *Attorney, Agent, or Firm* — Gerald E. Hespos; Michael J. Porco

(57) ABSTRACT

A seat frame (1) for a vehicle seat has two seat supports (3, 3) that extend in a longitudinal direction of the vehicle and are intended for laterally attaching the seat frame (1) to a vehicle floor (2) or to adjustment rails (16) for the seat frame (1). A seat shell (4) is mounted in and connected to the seat supports (3, 3) and is configured for accommodating a seat cushion. The seat shell (4) is connected to the respective seat support (3) so that the seat shell (4) and the seat support (3) form a closed profile in the connection region. The seat shell (4) is formed from a light metal and combines maximum weight reduction with a high degree of rigidity, in particular high torsional or bending stiffness.

19 Claims, 1 Drawing Sheet

FOREIGN PATENT DOCUMENTS

| | | |
|---|---|---|
| DE | 42 33 944 | 4/1994 |
| DE | 196 03 946 | 8/1997 |
| DE | 198 06 761 | 8/1999 |
| DE | 101 48 364 | 4/2003 |
| DE | 10 2004 063 527 | 12/2005 |
| DE | 10 2004 048 350 | 4/2006 |

* cited by examiner

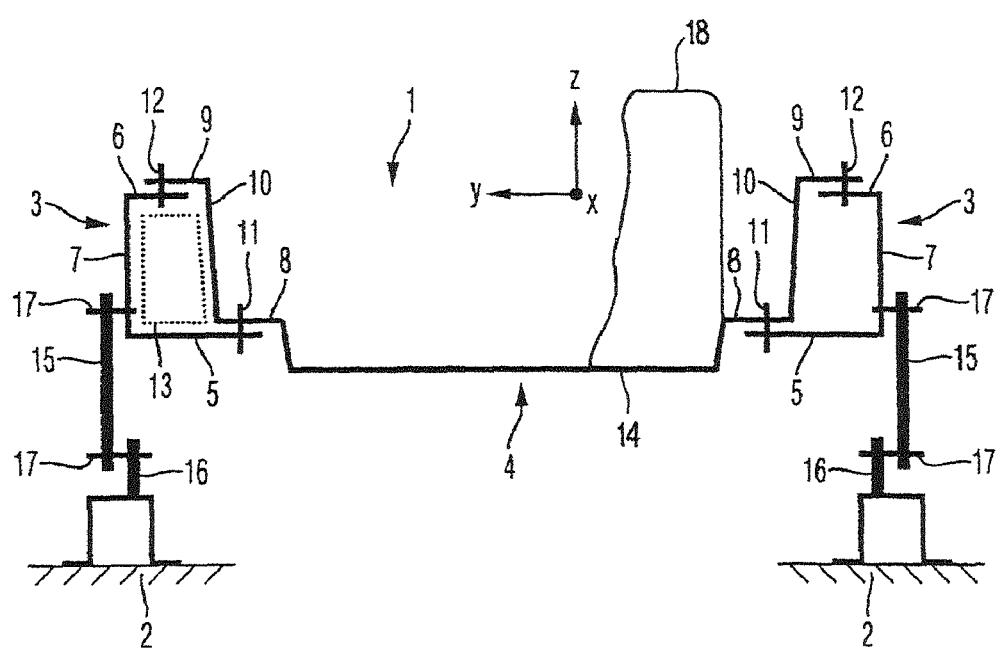

SEAT FRAME FOR A VEHICLE SEAT

CROSS-REFERENCE TO RELATED APPLICATIONS

This application claims priority under 35 USC 119 to German Patent Application No. 10 2009 020 586.1 filed on May 9, 2009, the entire disclosure of which is incorporated herein by reference.

BACKGROUND OF THE INVENTION

1. Field of the Invention

The invention relates to a seat frame for a vehicle seat. The seat frame has two seat supports that extend in the longitudinal direction of the vehicle and are intended for laterally attaching the seat frame to a vehicle floor or to adjustment rails for the seat frame. A seat shell is mounted in and connected to the seat supports and accommodates a seat cushion.

2. Description of the Related Art

Seat frames for vehicle seats are well known. For example, DE 196 03 946 A1 describes a vehicle seat with a seat frame and a backrest frame of die-cast light metal which are connected pivotably to one another via seat fittings.

DE 198 06 761 A1 discloses a method for producing a seat shell of a motor vehicle seat. The seat shell is produced by superplastic formed from a light metal alloy, such as a magnesium-containing aluminium alloy or an aluminium-containing magnesium alloy.

The object of the present invention is to develop a seat frame of the general type described above that combines maximum weight reduction with a high degree of rigidity, in particular torsional or bending stiffness.

SUMMARY OF THE INVENTION

The invention relates to a seat frame with a seat shell formed from a light metal and connected to a seat support in such a way that the seat shell and the seat support form a closed profile in the connection region.

The formation of the seat frame in the region of the seat shell and of the respectively assigned seat support as a closed profile contributes to increased torsional or bending stiffness of the seat frame in this region.

The fixed connection between the seat shell and the two seat supports results in the seat shell being active in the manner of a shear zone for transmitting forces from one seat support to the other seat support. Designing the seat shell as a shear zone enables a considerable weight reduction of the seat frame. The seat shell and the seat supports can be connected to one another by one of various connecting techniques. The aim is to achieve an increase in the torsional or bending stiffness between the seat support and seat shell by means of the closed profile.

The hybrid structure of seat shell and seat support is advantageous due to the different requirements placed on the seat support and seat shell with regard to stiffness and strength. More particularly, the seat shell preferably is formed from a light metal, such as aluminium, magnesium or an alloy of the respective metal. On the other hand, the respective seat support preferably is produced from a material having a stiffness and elongation at break that is higher than the material of the seat shell. For example, the seat support preferably is formed from steel or an aluminium alloy.

Accordingly, the seat frame of the invention achieves a maximum weight reduction in that the main load paths that occur under high loading, such as during a crash, are divided between the laterally arranged seat supports, with a high degree of rigidity and narrow space conditions, and the light metal seat shell, with a low degree of rigidity and planar space conditions. Thus, the seat shell accommodates the seat cushion and hence the occupant of the vehicle and also acts as a shear zone so that forces are transmitted from one seat support to the other. Buckling of the seat supports can thus be prevented.

Lateral forces generated during a side-impact crash can be transmitted from one seat support to the other seat support via the seat shell.

The connection of seat shell and respective seat support preferably is achieved by a riveted connection, adhesive connection or screwed connection or a combination of these types of connection. An adhesive connection is highly suitable when the seat shell and the respective seat support have flat and substantially planar contact faces in the connection region.

The seat frame of the invention is particularly advantageous due to the maximum weight reduction and the advantageous behaviour when introducing lateral forces into the seat frame. The maximum weight reduction and the high torsional stiffness is achieved by the hybrid structure, by the closed profile between the respective seat support and by the rigid design of the seat frame with high planar moments of inertia about the Y axis and Z axis. The crash behaviour is optimized since the seat shell is active as a shear zone.

The seat frame is particularly suitable for vehicle seats where the seat frames are attached to the adjustment rails via bearing elements by means of hinge connections.

Further features of the invention will become apparent from the appended drawing and the description of the preferred embodiment depicted in the drawing, without being limited to this embodiment.

BRIEF DESCRIPTION OF THE DRAWING

FIG. 1 is a schematic cross-section taken perpendicular to the longitudinal direction of the vehicle and showing the seat frame of the invention mounted in the vehicle floor.

DETAILED DESCRIPTION OF THE PREFERRED EMBODIMENTS

A seat frame for a vehicle seat of a passenger car is identified by the numeral 1 in FIG. 1 and is mounted in a vehicle floor 2.

The orientation of the arrangement shown is given by the coordinates X, Y and Z. The X coordinate extends in the vehicle longitudinal direction, the Y coordinate in the vehicle transverse direction and the Z coordinate in the vehicle height. The parts represented in the FIGURE are formed symmetrically with regard to the plane extending through the X-Z axis.

The seat frame 1 comprises two seat supports 3 that extend in the longitudinal or X direction of the vehicle. A seat shell 4 is mounted in and connected to the two seat supports 3, 3 and is intended to accommodate a seat cushion 18.

Each seat support 3 has a U-shaped cross section with two legs 5 and 6 and a web 7 connecting the two legs 5, 6. The web 7 is oriented vertically. The legs 5 and 6 are oriented horizontally, with the lower leg 5 being longer than the upper leg 6. The open sides of the two U-shaped seat supports 3 are directed towards one another.

The seat shell 4 has a Z-shaped cross section in the region of connection to the respective seat support 3. More particularly, the Z-shaped cross section is defined by two oppositely directed legs 8 and 9 and a web 10 connecting the legs 8 and 9. A connection 11 connects the lower leg 5 of the respective seat support 3 to the leg 8 of the seat shell 4. Furthermore a connection 12 connects the upper leg 6 of the respective seat support 3 to the leg 9 of the seat shell 4. The respective connections 11 and 12 preferably are riveted connections, adhesive connections, screwed connection or a combination of these types of connection.

The fixed connections between the respective seat supports 3 and the seat shell 4 and the described cross-sectional design of the seat support 3 and seat shell 4 defines a closed profile connection region of the seat support 3 and seat shell 4, as illustrated by the dotted closed line 13.

The seat shell 4 has a depression-forming, plate-shaped shell portion 14 between the legs 8 to accommodate the seat cushion 18.

Each side of the seat frame 1 is mounted at the front and rear in an articulated manner in an upper rail 16 via links 15 to adjust the inclination of the seat cushion 18 and hence of the seat frame 1. The upper rail 16, in turn, is mounted in the vehicle floor 2 so that the seat frame 1 is displaceable. Remote ends of the respective link 15 are mounted by hinge connections 17 in the web of the respective seat support 3 or of the assigned upper rail 16.

The seat shell 4 is formed from a light metal, and preferably aluminium, magnesium or an alloy of these metals. By contrast, the respective seat support 3 is formed from a material of increased rigidity and increased extension at break, and preferably is formed from steel, aluminium or an alloy of these metals. Thus, the seat frame 1 defines a hybrid construction formed by the seat shell 4 and seat supports 3 of the different constructions and materials described and/or illustrated herein to achieve a maximum weight reduction. Also the closed profile between the seat support 3 and seat shell 4 results in high torsional stiffness of the seat frame 1. The weight reduction is maximized further due to the design of the seat frame 1 with the production of high planar moments of inertia about the Y axis and Z axis.

What is claimed is:

1. A seat frame for a vehicle seat, the seat frame comprising:
    two seat supports that extend in a longitudinal direction of the vehicle and configured for attachment to a vehicle floor or to adjustment rails for the seat frame; and
    a seat shell mounted in and connected to the seat supports and configured for accommodating a seat cushion, the seat shell being connected to the two seat supports so that the seat shell and the two seat supports form two closed profiles in a connection region therebetween, the closed profiles extending in the longitudinal direction of the vehicle, the seat shell being formed from a light metal and the seat supports being formed from a metal having a stiffness and elongation at break that is higher than the material of the seat shell.

2. The seat frame of claim 1, wherein the seat shell is formed from aluminium, magnesium or an alloy of the respective metal.

3. The seat frame of claim 2, wherein the seat supports are formed from steel or an aluminium alloy.

4. The seat frame of claim 3, wherein the connection of seat shell and respective seat support is at least one of a riveted connection, an adhesive connection and a screwed connection.

5. The seat frame of claim 4, wherein the seat shell and the respective seat support have substantially planar contact faces in the connection region and the connection comprises an adhesive connection.

6. The seat frame of claim 1, wherein each of the seat supports has a U-shaped cross section with two legs and a web connecting the legs.

7. The seat frame of claim 6, wherein a region of the seat shell connected to the respective seat support has a Z-shaped cross section with two oppositely directed legs and a web connecting the legs.

8. The seat frame of claim 7, wherein the seat shell and respective seat support are connected in regions of the legs of seat shell and seat support.

9. The seat frame of claim 1, wherein the seat supports are attached to the adjustment rails via hinge connections.

10. A seat frame for a vehicle seat, the seat frame comprising:
    two opposed seat supports extending in a longitudinal direction of the vehicle and configured for attachment in proximity to a vehicle floor, each of the seat supports having a substantially vertically aligned support web with lower and upper ends, each of the seat supports further having lower and upper support legs extending from respective lower and upper ends of the support web and projecting toward the opposed seat support; and
    a seat shell with a cushion support configured for accommodating a seat cushion, opposite lower shell legs projecting away from one another at opposite sides the cushion support and connected to the lower support legs of the respective seat supports, shell webs projecting up from ends of the respective lower shell legs remote from the cushion support and spaced inwardly from the support webs of the seat supports and opposite upper shell legs extending away from one another at upper ends of the shell webs, the upper shell legs being connected to the upper support legs of the respective seat supports, whereby connections of opposite sides of the seat shell to the seat supports define substantially closed profiles.

11. The seat frame of claim 10, wherein the seat shell is formed from aluminium, magnesium or an alloy of aluminium or magnesium and wherein the seat supports are formed from a material of increased rigidity and increased elongation at break as compared to the seat shell.

12. The seat frame of claim 11, wherein the seat supports are formed from steel or an aluminium alloy.

13. The seat frame of claim 10, the seat shell and the seat supports are connected by at least one of a rivet, an adhesive and a screw.

14. The seat frame of claim 10, wherein the seat supports are attached to adjustment rails attached to the vehicle floor.

15. The seat frame of claim 14, wherein the seat supports are attached to the adjustment rails via hinge connections.

16. A vehicle, comprising:
    a vehicle floor;
    two opposed seat supports extending in a longitudinal direction of the vehicle and attached in proximity to the vehicle floor, each of the seat supports having a substantially vertically aligned support web with lower and upper ends, each of the seat supports further having lower and upper support legs extending from respective lower and upper ends of the support web and projecting toward the opposed seat support; and
    a seat shell with a cushion support configured for accommodating a seat cushion, opposite lower shell legs projecting away from one another at opposite sides the cushion support and connected to the lower support legs of the respective seat supports, shell webs projecting up from ends of the respective lower shell legs remote from the cushion support and spaced inwardly from the support webs of the seat supports and opposite upper shell legs extending away from one another at upper ends of the shell webs, the upper shell legs being connected to the upper support legs of the respective seat supports, whereby connections of opposite sides of the seat shell to the seat supports define substantially closed profiles.

17. The vehicle of claim 16, the seat shell and the seat supports are connected by at least one of a rivet, an adhesive and a screw.

18. The vehicle of claim 16, further comprising adjustment rails attached to the vehicle floor, the seat supports being attached to the adjustment rails.

19. The vehicle of claim 18, wherein the seat supports are attached to the adjustment rails via hinge connections.

* * * * *